April 13, 1926.
L. DE BARRIOS
AUTOMOBILE SAFETY FENDER
Filed July 9, 1925
1,581,041
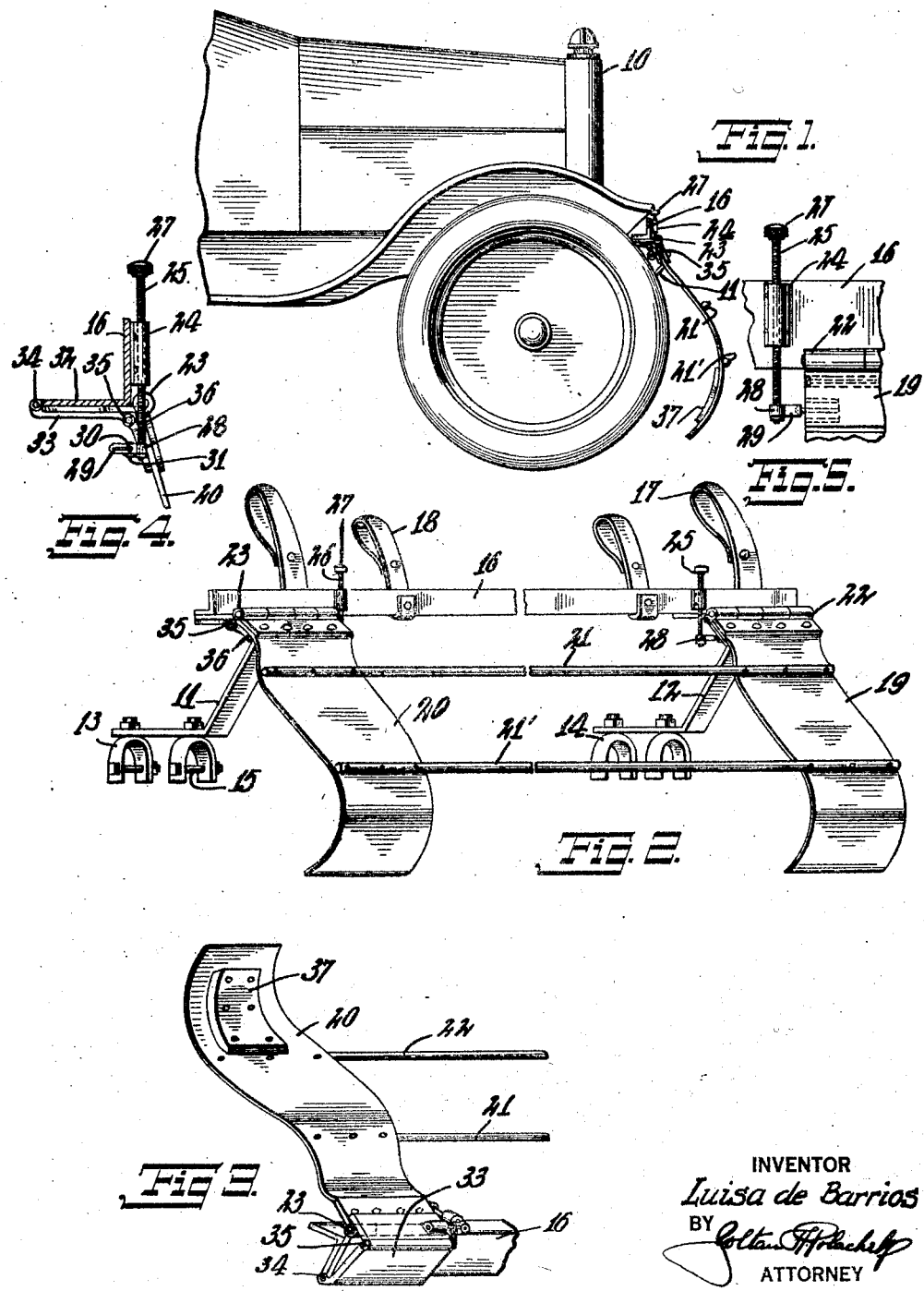
INVENTOR
Luisa de Barrios
BY
ATTORNEY Patented Apr. 13, 1926.

1,581,041

UNITED STATES PATENT OFFICE.

LUISA DE BARRIOS, OF BROOKLYN, NEW YORK.

AUTOMOBILE SAFETY FENDER.

Application filed July 9, 1925. Serial No. 42,428.

*To all whom it may concern:*

Be it known that I, LUISA DE BARRIOS, a citizen of Venezuela, residing at Brooklyn, in the county of Kings and State of New York, have invented certain new and useful Improvements in Automobile Safety Fenders, of which the following is a specification.

The present invention relates to improvements in fenders, particularly automobile fenders, and it is the principal object of the invention to provide a fender which, when not in use, can be inverted.

Another object of the invention is the provision of a fender of simple and inexpensive construction adapted to be readily attached to and detached from a car.

A further object of the invention is the provision of a car fender equipped with means for facilitating its turning movement.

These and other objects and advantages of the invention will become more fully known as the description thereof proceeds and will then be more particularly pointed out in the appended claims.

In the accompanying drawing forming a material part of this disclosure:

Fig. 1 is a fragmentary side elevation of a car equipped with a fender constructed according to the present invention.

Fig. 2 is a perspective view of the fender on an enlarged scale.

Fig. 3 is a fragmentary view of the fender, showing the same in its position of rest, reversed.

Fig. 4 is a detail view of the fender operating means.

Fig. 5 is a detail front view of the same.

A car 10 has attached thereto at its front, a pair of brackets 11 and 12 adapted to be attached to a front bar of the car frame by means of the pairwise arranged clamping members 13 and 14 held on said bar by means of nut bolts 15. The upper ends of the bracket arms support a connecting bar 16 having attached thereto a plurality of longer ears or loops 17 and smaller loops 18.

The fender proper consists of thin curved metal plates or wings 19 and 20 which are connected by the rods or bars 21 and 21', and connected to bar 16 by means of the hinges 22 and 23 respectively.

The bar 16 carries on its front face near the ends, sleeves 24 having inner threads adapted to be engaged by threaded bars 25 and 26 guided through said sleeves and equipped with upper operating heads or knobs 27. The lower ends of bars 25 and 26 have attached thereto a socket 28 ending in a slotted plate 29 in the slot of which a pin 30 of a roller 31 travels. The plate 16 has rectangularly disposed thereto a flange 32 to one end of which a hinge leaf 33 is pivotally attached as at 34, to the other end of which is pivotally attached, as at 35, a hinge leaf 36 against which the roller 31 engages and between which and the leaf of hinge 33, the fender plate 20 is provided.

Near the front edge the fender plates 19 and 20 are provided with weights 37 to assist in keeping the fender in its operating position.

The operation of the device will be entirely clear from the above description in combination with the drawing and it is to be understood that such changes may be made in the general arrangement of parts and in the construction of the minor details thereof, as fall within the scope of the appended claims and in the invention as shown and described as an example, without departure from the spirit of the invention.

Having thus described my invention what I claim as new, and desire to secure by Letters Patent, is:

1. Automobile fender comprising a pair of curved plates, a bar to which said plates are hinged, connecting rods for said plates, brackets for securing said plates to the automobile, and operating means for reversing said fender plates when not in use.

2. Automobile fender comprising a pair of curved plates, brackets for securing said fender to an automobile, a flanged bar, hinges connecting said plates and said bar, weights at the under side of said plates near the front ends thereof, and a pair of threaded sockets on said flanged bar, and operating means in said sockets for facilitating the reversing of said fender plates, when not in use.

3. In an automobile fender, a pair of curved plates, brackets supporting said fender in front of the automobile, hinge connections allowing a reversing of said plates, weights at the underside of said plates near their front ends, a connecting flanged bar to which said plates are hinged at the inner ends, socket on said bar, threaded and headed pins working in said socket, and means operated by said pins for facilitating the turning of said plates to reverse the fender.

4. In an automobile fender, reversible curved fender plates, connections for said plates, hinge connections allowing a reversing of said fender bars, means for securing the fender to an automobile, supports for said fender in its reversed position, weights on said bars to securely hold them in their operative position, and means for facilitating the reversal of the fender.

In testimony whereof I have affixed my signature.

LUISA DE BARRIOS.